(No Model.) 2 Sheets—Sheet 1.
C. H. LYMAN.
SUSPENSION DEVICE FOR LAMPS AND OTHER ARTICLES.
No. 354,514. Patented Dec. 14, 1886.
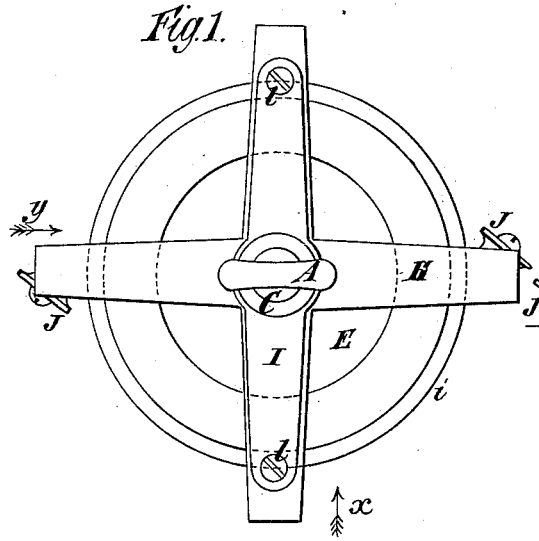
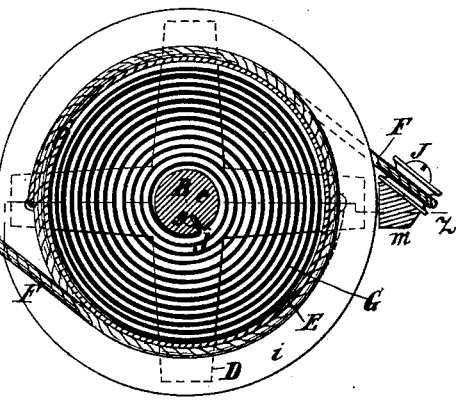
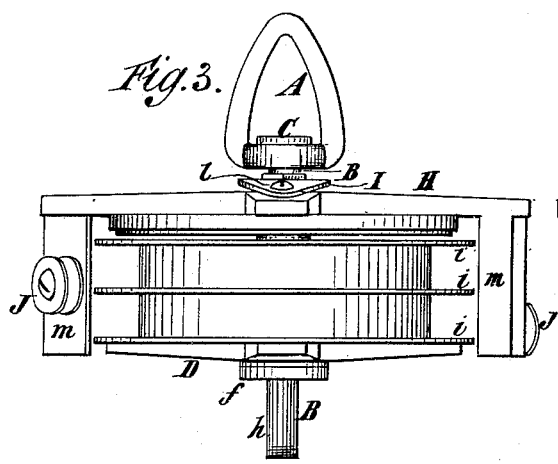
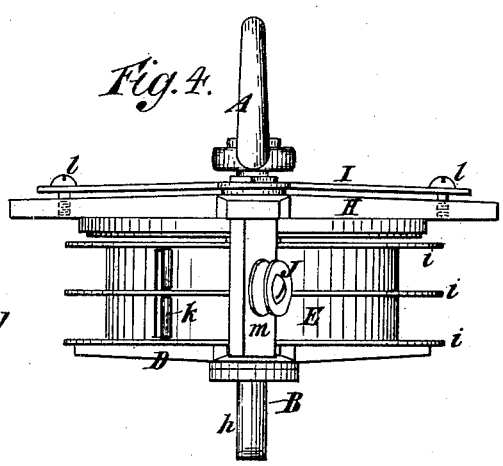
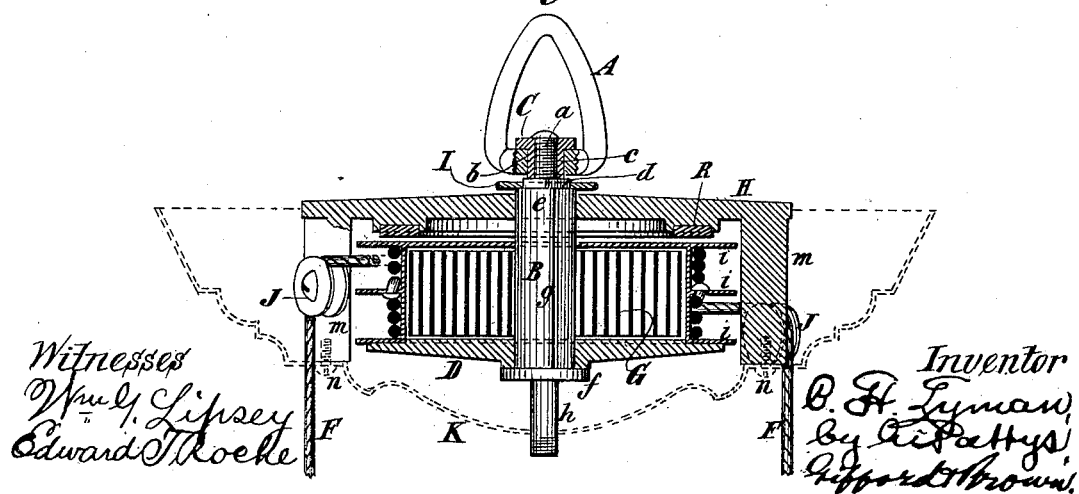
Witnesses
Wm. G. Lipsey
Edward T. Roehe
Inventor
C. H. Lyman
by Pattys
Gifford Brown (No Model.) 2 Sheets—Sheet 2.

C. H. LYMAN.
SUSPENSION DEVICE FOR LAMPS AND OTHER ARTICLES.

No. 354,514. Patented Dec. 14, 1886.

Witnesses
Wm. G. Lipsey
Edward T. Roche

Inventor
C. H. Lyman
by his attorneys
Gifford & Brown

UNITED STATES PATENT OFFICE.

CHARLES H. LYMAN, OF ANSONIA, CONNECTICUT, ASSIGNOR TO THE ANSONIA BRASS AND COPPER COMPANY AND WOLCOTT A. HULL, BOTH OF NEW YORK, N. Y.

SUSPENSION DEVICE FOR LAMPS AND OTHER ARTICLES.

SPECIFICATION forming part of Letters Patent No. 354,514, dated December 14, 1886.

Application filed October 30, 1884. Serial No. 146,832. (No model.)

*To all whom it may concern:*

Be it known that I, CHARLES H. LYMAN, of Ansonia, in the county of New Haven and State of Connecticut, have invented a certain new and useful Improvement in Suspending Devices for Lamps and other Articles, of which the following is a specification.

This improvement consists in the combination, in a suspending device for a lamp or other article, of a drum, an arbor to which the drum is fitted, a friction-brake, and a frame movable in the direction of the length of the arbor and provided with guides for cords or chains wound upon the drum, whereby the cords or chains will force the drum and friction-brake together with a force due to the weight of an article attached to the cords or chains. A spring will preferably be employed for moving the drum and friction-brake apart when permitted by the cords or chains.

Figure 6:
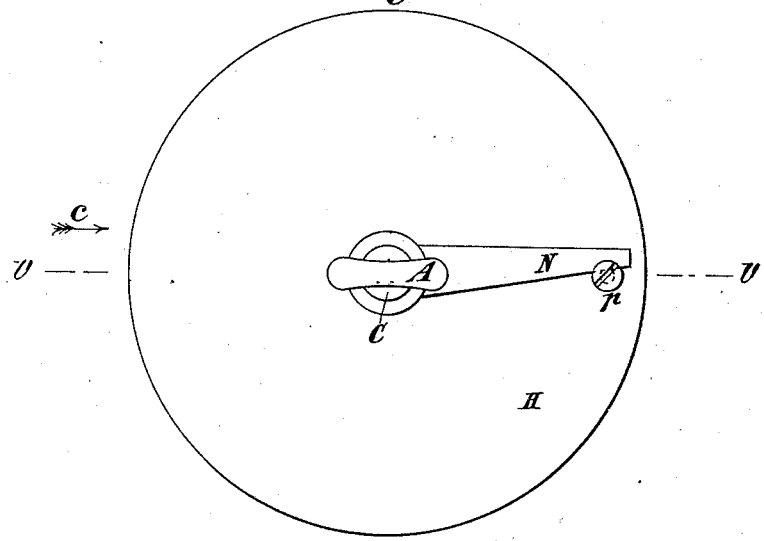
Figure 7:
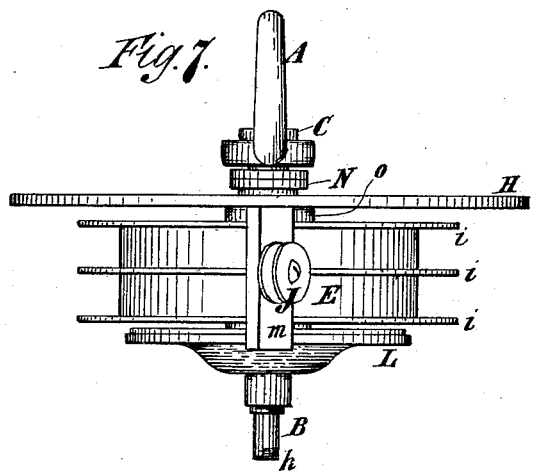
Figure 8:
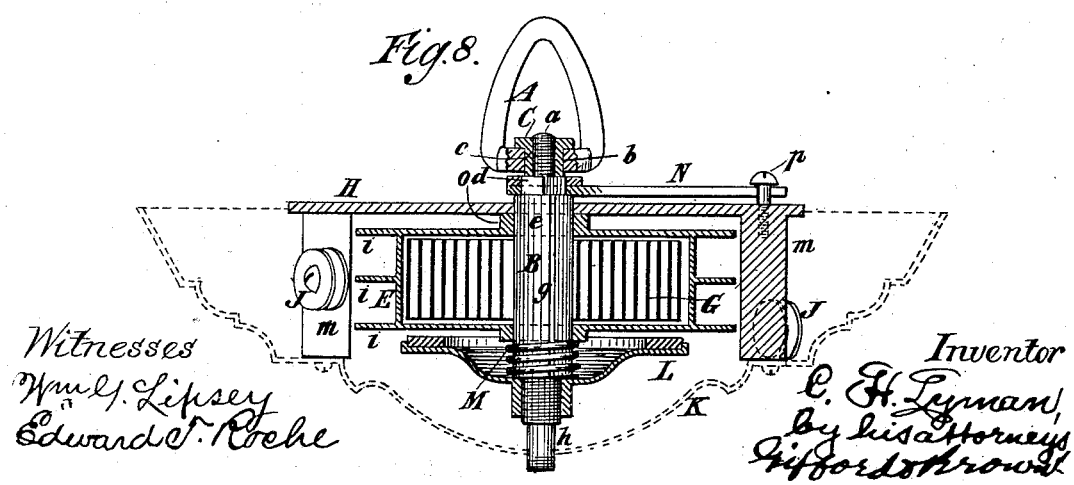

In the accompanying drawings, Figure 1 is a top view of a suspending device embodying my improvement. Fig. 2 is a horizontal section thereof, taken at about the middle of a drum comprised in the same. Fig. 3 is a side view of the suspending device, looking in the direction indicated by the arrow $x$, Fig. 1. Fig. 4 is a side view of the suspending device, looking in the direction indicated by the arrow $y$, Fig. 1. Fig. 5 is a vertical section of the suspending device, taken as indicated by the dotted line $z\,z$, Fig. 2. Fig. 6 is a top view of a suspending device embodying my improvement in a slightly-modified form. Fig. 7 is a side view of this suspending device, looking in the direction indicated by the arrow $c$, Fig. 6; and Fig. 8 is a vertical section of this suspending device, taken as indicated by the dotted line $v\,v$, Fig. 6.

Similar letters of reference designate corresponding parts in all the figures.

Referring first to the example of my improvement which is illustrated in Figs. 1, 2, 3, 4, and 5, A designates a loop, which may be hung on a hook or other appendage of a ceiling or other object. This loop is connected to an arbor, B. As shown, the arbor B has at the upper end a neck, $a$, or portion of smaller diameter than the portion below it, and the loop A has a hole or eye, $b$, which receives the neck $a$ within it. The neck is externally screw-threaded and has a nut, C, applied to it. The nut C, as shown, has a cylindric body, $c$, which extends into the hole or eye $b$ of the loop A, and a flange which extends above the lower portion of the loop A, containing the hole or eye $b$. After the nut has been applied to the neck $a$ of the arbor the end of the neck will preferably be upset to preclude the nut from coming off. Thus the loop and arbor are secured together with a swivel-joint. The arbor can be turned around relatively to the loop without becoming detached from it. Immediately below the neck $a$ of the arbor B the arbor is provided with a polygonal boss, $d$, and below this boss has a cylindric body, $e$. The body is provided with a longitudinal groove, $g$. At the lower end of the body $e$ is a laterally-extending flange, $f$. Below the flange $f$ is a portion, $h$, of small diameter. All these parts of the arbor may be made integral.

D designates a spider or device consisting of a number of arms extending from a common central portion, which is provided with a hole, so that it can fit upon the body $e$ of the arbor B. When in place upon the body $e$ of the arbor B, this spider D rests upon the flange $f$ thereof, and is thus supported.

E designates a cylindric drum having flanges $i$, between which are wound upon it cords or chains F, whereby a lamp or other article may be suspended. This drum, as shown, is open at the bottom; but it is closed at the top, with the exception of a central hole, enabling it to fit upon the body $e$ of the arbor B. At the bottom edge the drum rests upon the arms of the spider, these arms being shouldered at the outer end, to enable them to aid in holding it concentric with the arbor. The drum, and the spider also, may rotate upon the arbor B. It must be understood that the arbor B supports the spider, and consequently supports the drum also. The drum is rotated by the unwinding of the cords or chains F from it. A counter-balance is intended to be combined with the drum, for the purpose of resisting the unwinding of the cords or chains, and thereby sustaining the article attached to the cords or chains. I have shown in this example of my improvement a counter-balance, G, consisting of a convolute spring. This spring is coiled around the arbor B. One end is bent back to form a hook, $j$, which engages with the groove $g$ in the body of the arbor. The other end is bent to form a hook, $k$, which engages with the drum. When the drum is rotated in one direction, the spring will be coiled up more closely. When relieved of the force which coiled it and kept it coiled up, it uncoils and rotates the drum in a reverse direction.

H designates a frame, which has a central opening adapted to fit the body $e$ of the arbor B. It extends above the drum E, and is adapted to impinge upon the top of the same, so as to act as a brake upon it. As shown, it has on the under side a circular piece of india-rubber, leather, or like material, R, fitted into a groove, whereby it will be secured in place. This ring forms a brake which will act upon the top of the drum when the frame is moved down sufficiently far.

I designates a spring, consisting of a strip of metal having at the center a polygonal hole which fits the polygonal boss $d$, and having its ends fastened by screws $l$ or other means to the top of the frame H. This spring rests on the upper end of the body $e$ of the arbor B; hence the frame H is hung by the spring from the upper end of the body of the arbor. The spring will keep the frame normally so elevated that the frame will not act upon the drum. The frame may, however, be drawn down upon the drum against the resistance of the spring by which it is hung. The frame H has downwardly-extending arms $m$. Upon these arms are guides for the cords or chains F. These guides, as here shown, consist of pulleys J, mounted on studs or pins extending from the arms $m$. The cords or chains F pass from the drum E over the pulleys J, and thence to the article to be supported. The pulleys occupy such position that the cords or chains will draw the frame H down upon the drum E. The weight of the article supported by the cords or chains always draws and holds down the frame H with a force corresponding with its weight. When the article supported is raised, and the cords or chains consequently relaxed, the frame H will be raised by the spring I out of contact with the drum E. The drum then will be rotated by the counter-balance-spring to wind up the cords or chains.

Owing to the spring I being provided with a polygonal hole engaging with the polygonal boss $d$ of the arbor B, it prevents any rotary motion of the frame H relatively to the arbor, or, conversely, of the arbor relatively to the frame.

A canopy, K, (shown in dotted lines,) may be applied to the suspending device and secured by screws $n$ to the arms $m$ of the frame H.

The example of my improvement which is shown in Figs. 6, 7, and 8 is very similar to the one heretofore described.

The arbor B is similarly connected to the loop A. The drum E is constructed similarly to the drum before explained, except that it has a closed bottom as well as a closed top. The arbor, the drum, and the spring G are combined, as in the other example of my improvement. The arbor B has affixed to it, near the lower end, a friction-plate, L, forming a brake for the drum E. Preferably this will be faced with india-rubber, leather, or other like material. Around the body of the arbor B, between the bottom of the drum E and the friction-plate L, a spiral spring, M, is coiled. This keeps the drum separated from the friction-plate, except when it is overcome by other force. The top of the drum E has around its central opening an upturned rim, $o$. The frame H rests upon and is supported by the rim $o$. When the cords or chains applied to the drum E pull down the frame H, the latter forces the drum E down upon the friction-plate L with a force due to the weight of the article attached to the cords or chains. When the article attached to the cords or chains is lifted, the cords or chains release the frame H, whereupon the spring M raises the drum out of contact with the friction-plate L.

On the polygonal boss $d$ of the arbor B an arm, N, is mounted. The arm is interlocked with the boss, so that it cannot turn independent of the arbor. This arm N bears against a projection, $p$, on the frame H, and thereby prevents the arbor B from turning with the drum E when the latter is turned by the unwinding of the cords or chains F.

The parts of the suspending devices which I have described may be made of any appropriate metals.

On December 12, 1884, I filed an application for Letters Patent numbered 150,165, and on the 27th day of January, 1885, I filed an application for Letters Patent numbered 154,174, for suspending devices severally, having an arbor, a drum adapted to rotate upon the arbor, cords or chains wound upon the drum, passing thence over guides to the article which they are to suspend, a convolute spring coiled within the drum and serving to counterbalance the weight of an article suspended by the cords or chains, and a brake which is rendered effective when the drum is rotated in such direction as to unwind the cords or chains. Thus, generally considered, these suspending devices and the one which is the subject of my present application bear a resemblance. The suspending device which is the subject of my application No. 150,165 has the guides for the cords or chains arranged upon levers fulcrumed upon upright standards, so as to be capable of swinging toward and from the drum, and provided with brakes for acting upon the periphery of the drum. A feature of some importance in that suspending device consists in forming sheet-metal flanges on the drum and providing them with broadened rims at the peripheries. Another feature of that suspending device consists in providing levers which are combined with the drum with brake-pieces, movable lengthwise of the levers, so that the retardation of the drum produced by the brakes may be regulated to a nicety. I do not in my present application lay claim to any of these features.

The suspending device forming the subject of my application No. 154,174 has the guides supported upon a frame that is mounted upon the arbor of the drum. The weight of the article suspended by the cords or chains is not in that suspending device directly a factor in effecting the operation of the brake, but the brake is so combined with the drum that it will be applied when the drum is rotated, and also when anything tends to rotate it in such direction that the cords or chains will be unwound, and so that under other circumstances it will be relaxed. I do not in my present application lay claim to any of these features.

I have filed an application No. 186,942, December 28, 1885, for a United States Patent for an improvement in suspension devices. In said application I show an arbor, a rotary drum and a frame, both free to slide on the arbor, a brake below the drum rigidly supported by the arbor, and cords or chains passing from the drum over guides on the frame, by which the drum may be moved into intimate contact with the brake. I do not herein claim anything claimed in said application.

What I claim as my invention, and desire to secure by Letters Patent, is—

1. In a suspension device for a lamp or other article, the combination of a drum, an arbor to which the drum is fitted and about which it may rotate, a friction-brake adjacent to the end of the drum and movable toward and from the drum, a frame movable in the direction of the length of the arbor, guides upon said frame, cords or chains wound upon the drum and passing over said guides to a lamp or other article to be suspended, and a strap for preventing the rotation of the brake, substantially as described, whereby while the article attached to the cords or chains is being lowered the cords or chains will force the friction-brake against the drum, and while the article attached to the cords or chains is being raised the brake is released and the drum may rotate freely to rewind the cords or chains.

2. In a suspending device for a lamp or other article, the combination of a drum, an arbor to which the drum is fitted and about which it may rotate, a friction-brake surrounding and sliding upon the arbor, a frame movable in the direction of the length of the arbor, guides upon said frame, cords or chains wound upon the drum and passing over said guides to an article to be suspended, and a stop for preventing the rotation of the brake, substantially as described, whereby while the article attached to the cords or chains is being lowered the cords and chains will force the friction-brake against the drum, and while the article attached to the cords or chains is being raised the brake is released and the drum may rotate freely to rewind the cords or chains.

3. In a suspending device for a lamp or other article, the combination of a drum, an arbor to which the drum is fitted and about which it may rotate, a friction-brake surrounding and sliding upon the arbor, a frame movable in the direction of the length of the arbor, guides upon said frame, cords or chains wound upon the drum and passing over said guides to an article to be suspended, and a spring for moving the brake and drum apart, substantially as specified, whereby while the article attached to the cords or chains is being lowered the cords and chains will force the drum and friction-brake together, and the said spring will release the drum from the action of the friction-brake when the cords or chains are relaxed.

CHARLES H. LYMAN.

Witnesses:
R. HOADLEY,
A. S. TERRY.